United States Patent [19]

Parker

[11] Patent Number: 4,887,739

[45] Date of Patent: Dec. 19, 1989

[54] BUSINESS CARD DISPENSER

[76] Inventor: Robert J. Parker, 805 E. Moler Ave., Martinsburg, W. Va. 25401

[21] Appl. No.: 200,588

[22] Filed: May 31, 1988

[51] Int. Cl.⁴ .................... B65H 3/00; B65G 59/00

[52] U.S. Cl. .................... 221/232; 221/244; 221/259; 221/270; 221/155

[58] Field of Search .............. 221/244, 246, 255, 256, 221/257, 259, 268, 270, 232, 279, 155, 290, 292, 226, 227; 271/128; 206/425, 215, 449, 555, 556, 559, 805; 211/51, 59.2, 59.3; 222/251, 243

[56] References Cited

U.S. PATENT DOCUMENTS

| | | | |
|---|---|---|---|
| 806,985 | 12/1905 | Mallory | 206/39.5 |
| 909,110 | 1/1909 | O'Neil | 221/232 |
| 1,244,338 | 10/1917 | Johnson | 221/232 |
| 1,503,144 | 7/1924 | Warwick | 221/232 |
| 1,697,366 | 10/1927 | Opfergelt | 221/232 |
| 2,152,174 | 3/1939 | Brunetti | 221/232 |
| 2,591,855 | 4/1952 | Nicholson | 221/232 |
| 2,803,378 | 8/1957 | Bundling | 221/232 |
| 2,973,882 | 3/1961 | Jeffus | 221/228 |
| 3,308,989 | 3/1967 | Alltop et al. | 221/232 |
| 3,393,831 | 7/1968 | Stewart | 221/232 |
| 4,034,894 | 7/1977 | Lermann et al. | 221/232 |
| 4,240,564 | 12/1980 | Pritchard | 221/232 |
| 4,792,058 | 12/1988 | Parker | 221/232 |

*Primary Examiner*—Joseph J. Rolla
*Assistant Examiner*—Mona C. Beegle
*Attorney, Agent, or Firm*—Dowell & Dowell

[57] ABSTRACT

A compact business or calling card dispenser which includes a casing in which a plurality of cards are stacked in a vertical array on a card support plate that is resiliently urged so as to align the cards relative to a discharge slot or opening in the casing and which includes an ejector mechanism which interacts with the card support plate to insure uniform card dispensing characteristics with each stack of cards carried within the dispenser.

23 Claims, 4 Drawing Sheets

BUSINESS CARD DISPENSER

BACKGROUND OF THE INVENTION

1. Field of the Invention

This invention is generally directed to dispensers for dispensing sheet-like articles from a support casing and more specifically to a compact business or calling card dispenser of a size to be conveniently carried in a person's coat, shirt or pants pocket. The dispenser includes a casing in which a plurality of business or calling cards are housed and from which are sequentially dispensed through a discharge slot utilizing an ejector or dispensing mechanism which cooperates with a card support plate resiliently positioned within the casing so as to insure that the cards are dispensed uniformly and without binding with the casing when the ejector mechanism is operated. The ejector mechanism for the dispenser is resiliently operated so that after a card is dispensed, the ejector mechanism automatically assumes a position for ejecting another card.

In one embodiment, the ejector mechanism incorporates a friction element which is designed to engage the cards or other articles as they are dispensed to thereby prevent any misfeeding of the articles from the dispenser casing.

In another embodiment of the invention, the card support casing is provided with a resilient guide member which is positioned adjacent the card discharge slot so as to prohibit the accidental dispensing of more than a single card at a time regardless of the thickness of the cards.

2. History of the Related Art

There are numerous occupations and professions which require individuals to carry their business or calling cards to identify themselves to prospective customers or clients. Over the years, there have been numerous attempts to provide card carriers or dispensers which serve to house a plurality of business or calling cards so that a card may be available when necessary to the person utilizing the card dispenser or carrier. In some instances, people will carry business cards loosely in their wallet, purse or pocket, however, business or calling cards carried in such a manner are frequently damaged or even destroyed as there is nothing to protect the integrity of the card while it is being loosely carried. Therefore, when a person needs to present a card to a prospective client or other person, the card being presented is sloppy or messy in appearance and that appearance relates directly to the professionalism of the person presenting such a card.

Other types of business or calling card holders have been designed out of leather or synthetic plastics and provide a small carrying pouch in which a number of cards may be selectively housed. Unfortunately, such pliable receptacles do not protect the integrity of the cards and the cards are frequently bent or otherwise deformed while being carried in such receptacles. Even in those instances where the utmost care is given to protecting such flexible receptacles for business cards, the housings themselves are not designed to provide equal pressure on the cards contained therein and certain cards will be subject to bending forces because of their arrangement within the carrier.

To overcome the foregoing problems, there have been numerous structures developed for protectively housing business or calling cards in dispensers having fairly rigid casings. In most of these dispensers, some type of ejector mechanism is provided to sequentially eject one card at a time from the casing while retaining the remaining cards within the casing in a compact and generally vertical array.

In applicant's copending U.S. patent application, Ser. No. 07/045,474, filed May 4, 1987, U.S. Pat. No. 4,792,058, and entitled Business Card Dispenser, a card dispenser is disclosed which presents an improvement over prior card dispensers. In that application, a dispenser is disclosed which is designed to provide support for a plurality of cards within a very compact casing. The dispenser not only provides security and protection for the cards to be housed therein but also provides a lightweight structure of such a size and shape as to be conveniently carried by a person in their pocket. The dispenser includes a removable cover and a card support plate upon which a plurality of business or calling cards are stacked. The support plate for the cards is resiliently urged upwardly towards the cover of the dispenser and serves to progressively feed the stack of cards towards an ejector mechanism which upon operation of a slide button urges the uppermost card from the stack outwardly through the opening in the casing formed between the cover and the primary body of the casing.

After using the dispenser of the aforementioned application, it was noted when different thicknesses of business or calling card materials were utilized, that on occasion, a card would bind with the ejector mechanism or at the slot in the housing and would not Be properly ejected or would be ejected with the card being scraped along an edge portion. Further, in some instances, the ejector mechanism would misfeed with the uppermost card binding somewhat within the casing. To overcome this, it was necessary to find a way to overcome the problem of the cards binding within the casing and to provide a partial release of pressure on the stack of cards so that the card stack would not interfere with the dispensing of the uppermost card during the operation of the ejector mechanism. Other misfeed problems were noted as the ejector would occasionally not properly engage the card being dispensed thereby requiring the ejector mechanism to be operated several times to dispense a single card.

There have been many other card dispensers or ticket dispensers designed over the years which incorporate a spring loaded card support plate mounted within a housing which support plate urges the cards vertically towards a dispensing mechanism. Some examples of these dispensers include U.S. Pat. No. 806,985 to Mallory, U.S. Pat. No. 909,110 to O'Neil, U.S. Pat. No. 1,244,338 to Johnson, U.S. Pat. No. 1,503,144 to Warwick, U.S. Pat. No. 1,697,366 to Opfergelt, U.S. Pat. No. 2,152,174 to Brunetti, U.S. Pat. No. 2,591,855 to Nicholson, U.S. Pat. No. 2,973,882 to Jeffus, U.S. Pat. No. 2,803,378 to Gundling, U.S. Pat. No. 3,308,989 to Alltop et al. and U.S. Pat. No. 3,393,831 to Stewart. As with applicant's prior structure for a card dispenser, each of the foregoing patents discloses a structure that utilizes a spring loaded card support plate that places continuous pressure on the vertical stack of cards carried within the dispenser. Unfortunately, the exertion of continuous pressure on the vertical array within card dispensers has been found to be undesirable especially where heavier or thicker business cards are being dispensed. Oftentimes, the pressure on the vertical stack will cause the uppermost card to be forced against the housing or casing of the dispenser in such a manner that the card will be damaged or will jam in the opening of the casing as the ejector mechanism is operated. In some instances, the rear portion of such cards will be damaged as the ejector slides over the end of the card and the card binds within the casing.

An additional problem inherent in prior art dispensers relates to the accidental dispensing of more than a single card at a time. Often, due to the frictional contact between the card being dispensed and the next or underlying card, the underlying card will also be moved outwardly of the card support housing or casing. This requires that the extra card be reinserted into the housing for subsequent dispensing. The problem of dispensing two or more cards at a given time is further complicated by the differing physical characteristics of business and calling cards. As cards have differing thicknesses, the openings or discharge slots of conventional dispensers must be of a size to permit the thicker cards to pass therethrough. For example, conventional business or calling cards may have material thicknesses ranging between 0.005 to 0.012 inch (0.127 to 0.305 mm). Therefore, the opening or discharge slot in the casing or dispenser, such as the dispenser disclosed in applicant's previously discussed prior application, would be approximately 0.012 inch (0.305 mm). Due to the size of opening, when thinner cards were being dispensed, two cards would pass through the opening at a given time.

The present card dispenser has been specifically designed to alleviate the problems associated with the uniform and orderly dispensing of cards from card dispensers having substantially rigid casings or housings.

SUMMARY OF THE INVENTION

This invention is directed to a business or calling card dispenser which includes a compact but substantially rigid housing or casing in which a plurality of business or calling cards may be stacked in a vertical array for dispensing in sequential order. The dispenser is of a size to be conveniently carried within a person's pocket and includes a slideably removable cover which is selectively engageable with the main body of the casing which includes generally continuous side, end and lower wall portions. The overall size of the housing or casing is designed to be just slightly larger than the cards which are to be dispensed. Also, the housing or casing is provided with an opening or ejection slot through which the cards are disposed which is of a size to permit cards of varying material thickness to be utilized with the dispenser. Further, a resilient guide or restriction member is disposed adjacent the opening or slot and which functions to limit the number of cards moving toward the opening to a single card, regardless of a card's thickness. The guide permits the cards to move through the opening and yields slightly to permit thicker cards to move through the opening.

The dispenser further includes a card support plate which has incorporated therewith resilient legs which urge the support plate toward the upper portion or cover of the dispenser. An ejector mechanism is mounted within the casing and includes portions disposed on opposite sides of a card support plate. The card support plate is engaged by an elastic member which interconnects the support plate to the portion of the ejector mechanism below the plate so that the support plate serves as an anchor for insuring the automatic return of the ejector mechanism after each dispensing cycle. As the ejector mechanism is resiliently secured to the card support plate within the housing and as the resilient member is positioned below the card support plate, each time the ejector button which extends through the side wall of the casing is operated, the resilient band or member which connects the ejector to the card support plate will cause the card support plate to yield slightly with respect to the vertical stack of cards thereby effectively reducing the pressure on the stack and allowing the uppermost card to be dispensed without the full force of the card support plate being directed against the card.

In a preferred form of the invention, the ejector mechanism includes an elongated body portion having an outwardly extending flange which is positioned through a slot in the side wall of the casing and to which an operating button is frictionally engaged. The ejector also includes a card engaging flange which is positioned above the card support plate and which extends from the main body portion. The flange is of a size to engage the edge of a card to be dispensed. Further, in some embodiments of the invention, it is preferred that the lid of the dispenser be made of a transparent material so that the indicia carried on the business or calling cards is viewable through the upper portion of the dispenser so as to readily identify not only the owner but to give an immediate indication when it is necessary to introduce additional cards into the dispenser. In a further embodiment of the invention, the ejector mechanism is provided with one or more friction members which may be in the configuration of elastic bands which are mounted adjacent to the card engaging flange. In this embodiment, the bands create a positive frictioned engagement with a card being dispensed and hereby prevent misfeeding of a given card. While the flange is modified in configuration so as to permit the retraction of the ejector without interference between the friction members and the stack of cards within the dispenser casing.

It is a primary object of the present invention to provide a business or calling card dispenser which is relatively compact in size but is sufficiently rigid to maintain professional business or calling cards within the dispenser in such a manner that the cards will not be torn, bent or otherwise damaged and which will insure that the cards are dispensed from the dispenser in such a manner that each card will retain a business-like appearance.

It is yet a further object of the present invention to provide a business or calling card dispenser which incorporates an ejector mechanism which is resiliently mounted to the card support plate within the dispenser in such a manner that as the ejector mechanism is operated, pressure to the stack of cards within the dispenser is modified and slightly reduced by withdrawing the card support plate with respect to the cards supported thereon whereby pressure is relieved on the uppermost card which is being dispensed by the ejector mechanism.

It is another object of the present invention to provide an ejector mechanism for a business or calling card dispenser which includes one or more friction members which serve to positively engage the ejector with the uppermost card in a stack of cards to be dispensed to thereby prevent card misfeeds and wherein the friction members are spaced from the cards as the ejector mechanism is returned to its rest position thereby preventing a malfunction of the ejector which might otherwise occur if the friction members were in continuous contact with the cards within the dispenser.

It is also an object of the present invention to provide a business or calling card dispenser which may be selectively loaded or refilled with additional business or calling cards and which includes a slideable upper cover portion which is easily manipulated with respect to the main portion of the casing so as to permit additional cards to be placed therein. Further, the cover may be made of a substantially clear or transparent material so as to allow the owner to have an immediate indication that additional cards should be placed within the dispenser.

It is yet another object of the present invention to provide an article dispenser which is particularly adapted to dispense conventional business or calling cards regardless of the thickness of the material from which the cards are constructed and which further prevent the accidental dispensing of more than one card at a time.

It is yet a further object of the present invention to provide a business or calling card dispenser which is manufactured substantially of all plastic materials and which may be rapidly assembled so as to facilitate the manufacture of the dispensers and to reduce overall costs.

DESCRIPTION OF THE PREFERRED EMBODIMENT

Figure 2:
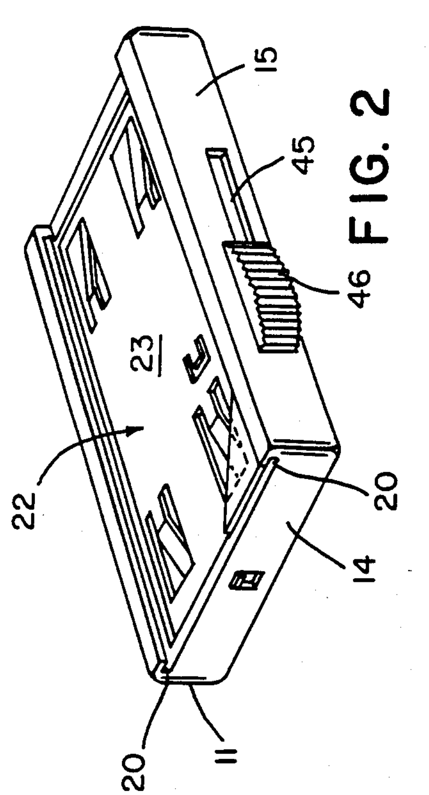
FIG. 2 is a perspective view of the dispenser shown in FIG. 1 taken from the opposite end thereof and showing the dispenser with the cover portion removed.

With continued reference to the drawings, the dispenser 10 of the present invention is designed for retaining and dispensing a plurality of business or calling cards C which are vertically stacked in an array within the base portion 11 of the housing or casing 12. The base portion of the casing includes a forward end wall 13 and rear wall 14 and opposed side walls 15 and 16 which are integrally formed with the bottom wall 17. The casing 12 further includes an upper slideable cover 18 having a pair of elongated flange elements 19 formed along either side thereof which flanges are slideably received within a pair of notches 20 molded in the inside of each of the side walls 15 and 16. The notches terminate just inwardly of the front wall 13 of the casing so that the lid may not be forced forwardly of the casing. This will prevent the accidental displacement of the lid portion of the dispenser as cards are ejected therefrom. The lid 18 is slideably removable from the rear portion or wall 14 of the casing as the slots 20 extend through such end portion as shown in FIG. 2. In this manner, the lid may be slideably removed from the body portion 11 of the casing so that cards may be placed inwardly of the casing and on top of the card support plate 22 which is mounted therein.

Figure 4:
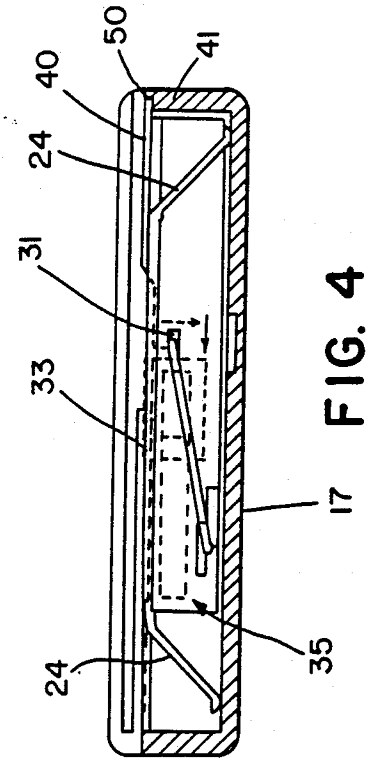
FIG. 4 is a cross sectional view taken along lines 4—4 of FIG. 3.
Figure 3:
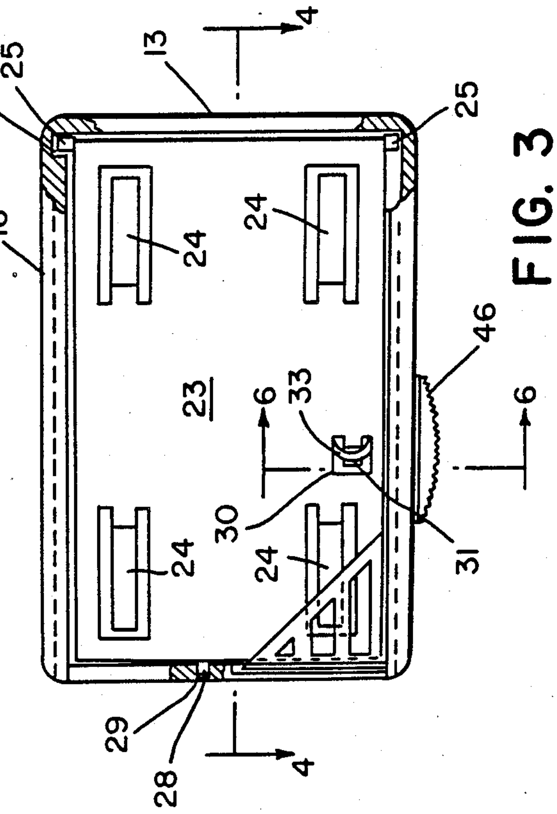
FIG. 3 is a top plan view of the dispenser shown in FIG. 2 with the slideable lide portion being removed and having portions broken away to show the guide members of the card support plate positioned within openings in the body portion of the dispenser.

The card support plate 22 is of a size to be selectively received in close proximity to the side and end walls of the base portion 11 of the casing 12. The support plate includes an upper surface 23 upon which a plurality of cards C may be selectively stacked. The plate is resiliently urged vertically upwardly within the base 11 by means of a plurality of integrally formed spring legs 24 which extend downwardly from the surface portion 23 into engagement with the bottom wall 17 of the base portion 11. The card support plate 22 is preferably formed of a plastic material so that the leg members 24 will inherently have resilient properties when they are molded into the configuration shown in the drawings. To provide a uniform and equally distributed force on the cards carried on the support plate, the spring leg members are generally equally spaced at each end of the support plate as shown in FIGS. 2–4. When the dispenser is completely filled with cards, the spring legs will be forced outwardly so that the plate portion 22 will be in relatively close but spaced proximity to the bottom wall 17 of the dispenser. As cards are dispensed, the spring legs 24 will continue to urge the plate 22 upwardly towards the lid 18 of the dispenser. Although the integrally formed leg portions shown in the drawings are the preferred method for providing a yieldable support for the support plate, it is possible that separate spring members could be used, however, this would add to the overall cost and complexity of the design of the dispenser which has purposefully been designed to eliminate extraneous components, additional manufacturing costs and increased assembly costs by minimizing the number of parts in the overall assembly.

In order to positively guide the vertical movement of the card support plate relative to the base 11 of the card dispenser casing, the plate is provided with a pair of outwardly extending guide projections 25 which are positioned adjacent one end thereof. These projections are located within recessed open areas 26 formed adjacent the front end wall 13 of the dispenser housing or casing base member 11. The opposite end of the card support plate 23 includes an outwardly extending projection 28 which is guided within a slot 29 formed within the end wall 14 of the base 11. The projections 28 and 25 carried by the support plate 23 will insure that the support plate uniformly moves vertically with respect to the base portion of the casing as cards are ejected from the dispenser and will confine the plate within the base portion.

There is also provided in the support plate 22 an opening 30 having a small projection 31 extending therein. The projection is provided in order to support one end of the resilient band 33. The band 33 is an elastic band such as a rubber band or may be a small spring which is utilized to automatically return an ejector mechanism 35 inwardly with respect to the base of the dispenser each time the ejector mechanism has been operated.

Figure 5:
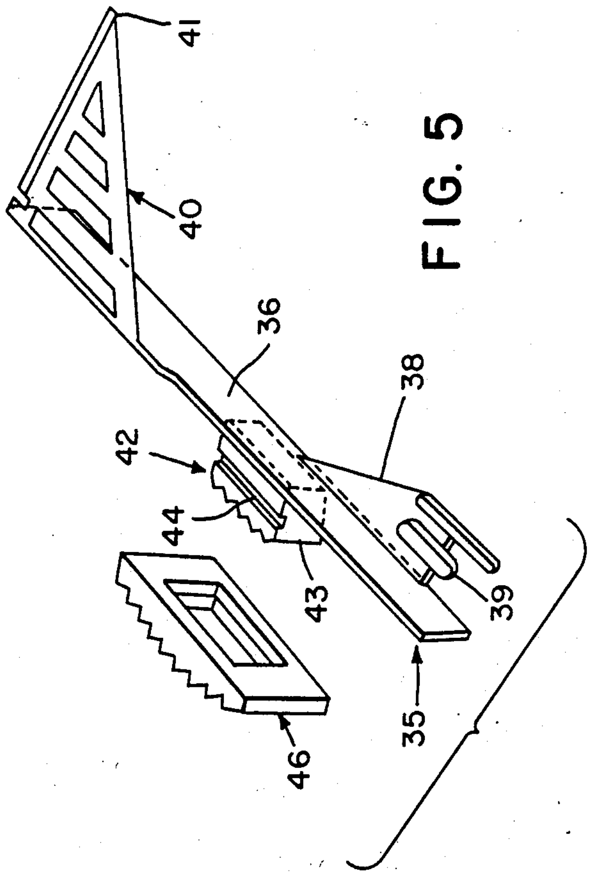
FIG. 5 is an enlarged perspective assembly view of the ejector mechanism of the present invention showing the slide button which is normally mounted on the outside of the housing or casing.
Figure 6:
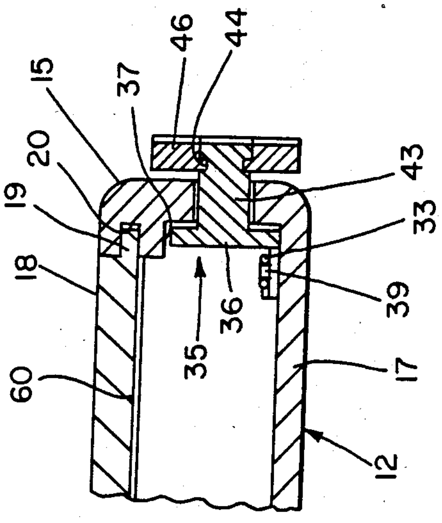
FIG. 6 is an enlarged partial cross sectional view taken along lines 6—6 of FIG. 3.

With particular reference to FIGS. 5 and 6, the ejector mechanism will be described in greater detail. The ejector 35 includes an elongated body portion 36 which is slideably mounted within an enlarged recessed area 37 formed in the inside of side wall 15. In this manner, the elongated body portion 36 of the ejector mechanism may be slideably moved along the inside surface of the wall 15 without interfering with the card support plate which is positioned outside of the recessed area 37 as shown in FIG. 3.

The ejector mechanism 35 also includes a forward flange element 38 which extends perpendicularly to the body portion 36 on the inside of the casing. The flange element 38 is positioned below the card support plate and carries at least one forwardly extending projection 39. The projection 39 is selectively usable to support the opposite end of the elastic band 33 as is shown in FIG. 4 of the drawings. A second outwardly extending generally triangular flange element 40 extends from the rear portion of the body 36 and generally perpendicular with respect thereto so as to be positioned above the card support plate 22. The flange 40 is integrally formed with the body portion and includes a rearwardly oriented and downwardly extending card engaging edge 41 which extends substantially along the full length of the flange. The depending edge 41 extends downwardly with respect to flange 40 a distance slightly less than the thickness of a card to be dispensed from the dispenser.

The ejector mechanism further includes a button mounting assembly 42 which is integrally molded along the opposite portion of the body 36 relative to the flanges 38 and 40. The mounting assembly includes an outwardly extending member 43 having a pair of upper and lower grooves 44 formed therein. The outermost surface is grooved or ribbed in order to provide a thumb engaging surface. The member 43 extends through an opening 45 provided in side wall 15 so as to be slideable along such opening. The ejector mechanism is lockingly secured adjacent the opening 45 by engaging a generally open and rectilinear push button 46 into locked engagement with the grooves 44 in the member 43.

As previously discussed, one of the advantages of the present invention over prior art card dispensers is that the structure of the present invention is designed to prevent binding of the cards within the dispenser casing as the cards are ejected. To this end, the resilient band element 33 which functions to automatically return the ejector mechanism into the housing after each dispensing operation also provides a secondary function. As disclosed in FIG. 4 of the drawings, the resilient band member is engaged both with the projection 31 formed on the card support plate 22 and with the projection 39 formed on the ejector mechanism 35. Further, as the ejector mechanism mounting portion 39 is spaced below the plate member 22, the band member extends diagonally. Therefore, each time the ejector mechanism is moved to the left as shown by the arrow in FIG. 4, a portion of the force of the band member which urges the ejector back inwardly of the housing will also have a vertical vector or force downwardly as shown by the dotted line arrown in FIG. 4. Therefore, each time the ejector mechanism button is engaged and moved along slot 45 to eject a card from the dispenser, the resilient element 33 will not only be urged inwardly of the end wall of the housing but will simultaneously urge the card support plate slightly downwardly with respect to the cover of the housing. Therefore, the pressure on the card relative to the ejector mechanism is slightly released allowing the card to slide easily with respect to any cards or the support plate surface as the card is being ejected from the dispenser. Once a card has been ejected, the resilient element 33 is fully stretched and therefore acts to automatically return the ejector mechanism to its normal rest position. In order to permit the ejector to be fully seated within the housing, and also to permit the ejector card engaging edge 41 to assume a position adjacent the rear of each card to be dispensed, the housing further includes an elongated recess 50 which extends along the rear wall 14 for a distance sufficient for the edge 41 to be seated rearwardly of the cards and the card support plate as shown in FIG. 4. In some instances, the recess may extend substantially across the full width of the base portion of the housing to accommodate ejector edges of increased dimension.

The card dispenser of the present invention is preferably constructed of moldable plastic materials with the exception of the elastic band element 33. Each of the components is designed to be interfitted by simply snapping the elements together relative to one another so that assembly may be easily facilitated thereby reducing production costs. Further, the elements are designed to be lightweight so that the overall unit is bearly detectable within the pocket of the person carrying the dispenser. Further, the lid element 18 is preferably constructed of a clear or transparent plastic material so that the cards carried on the support plate may be readily viewed through the lid so as to identify the dispenser as belonging to a particular person. Further, the clear plastic lid enables the user to immediately ascertain when it is necessary to introduce additional business cards or calling cards into the dispenser.

Figure 1:
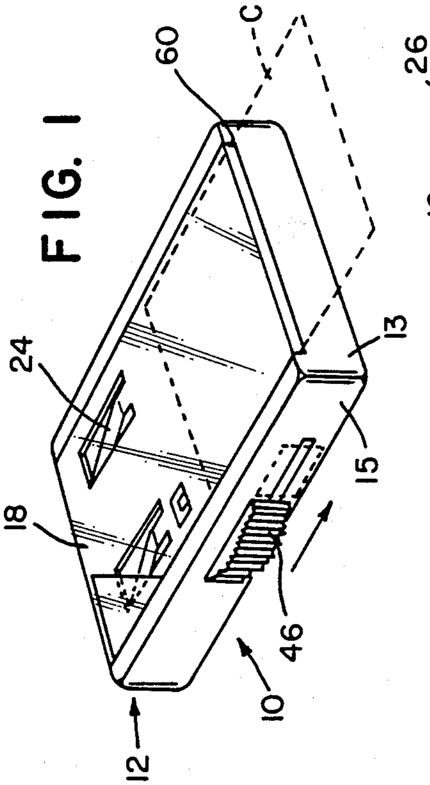
FIG. 1 is a perspective view of the card dispenser of the present invention showing a clear or transparent slideable lid.

In the use of the calling card dispenser of the present invention, the lid 18 is slidingly moved rearwardly with respect to the rear wall 14 of the base 11. After the lid has been removed, a number of business or calling cards are placed on the card support plate. Thereafter, the lid is slidingly engaged in the channels 20 and while depressing the stack of cards, the lid is slid into engagement with the base portion. When it becomes necessary to dispense a card from the dispenser, the knob 46 is engaged by the thumb and urged forwardly along the open channel or opening 45 in side wall 15. During this forward movement, the card engaging depending edge 41 of the ejector mechanism will engage the rear edge of the uppermost card in a stack of cards and force the card forwardly towards an opening 60 which is provided between the forward edge of the lid 18 and the forward wall 13 thereof. The card will be dispensed as shown in dotted line in FIG. 1 so as to be easily engagable and pulled outwardly with respect to the casing. As the ejector mechanism is urged forwardly, the card support plate will be urged slightly downwardly as shown in dotted line in FIG. 4 due to the resilient connection between the slide element and the card support tray and the vertical displacement of the slide element relative to the card support tray. In this manner, compressive forces will be slightly relieved relative to the stack of cards carried within the dispenser thus allowing the uppermost card to be easily slideably movable with respect to the card support plate as the ejector mechanism is moved to the left as shown in FIG. 4 of the drawings. Once the card has been ejected, the resilient band 33 will cause the ejection member to reassume its initial position as shown in full line in FIG. 4.

Figure 7:
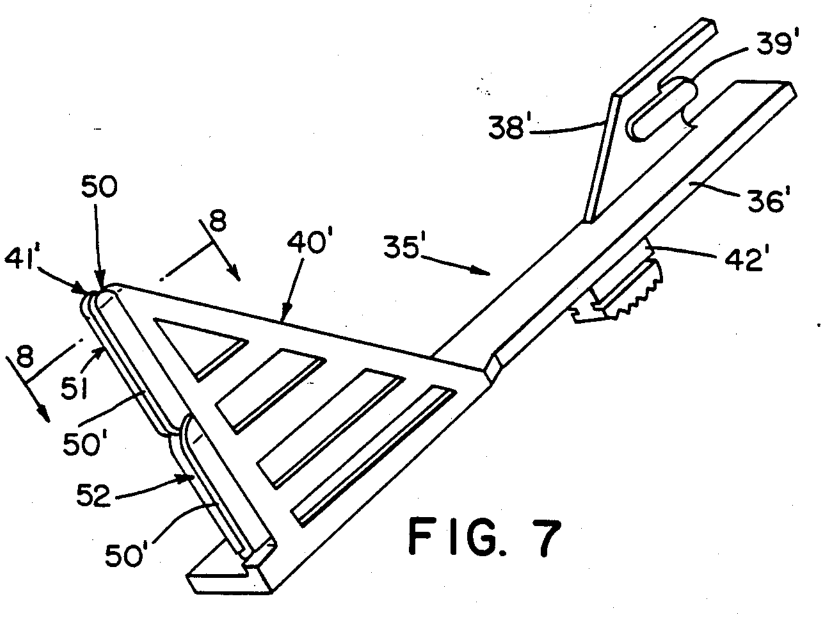
FIG. 7 is an enlarged perspective view of a modified ejector mechanism of the present invention in which friction bands are mounted adjacent the ejector flange to promote the positive displacement of cards from the dispenser.
Figure 8:
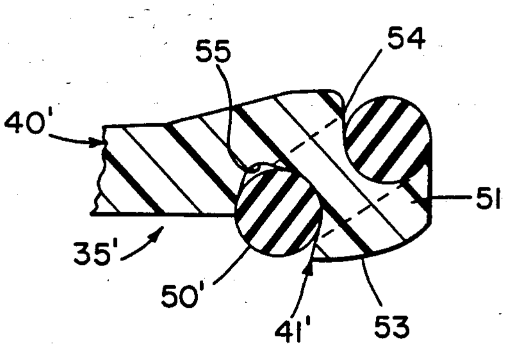
FIG. 8 is an enlarged partial cross sectional view taken along lines 8—8 of FIG. 7.

With particular reference to FIGS. 7 and 8, a modified ejector mechanism 35' is shown in greater detail. The modified ejector is particularly constructed so as to reduce potential card misfeeds upon each operative movement of the ejector mechanism. The modified ejector mechanism is substantially the same shape and configuration as the ejector mechanism shown in FIG. 5 and includes an elongated body portion 36', forward flange portion 38' and elastic band projection support 39'. The ejector mechanism also includes a rearwardly disposed flange 40' and push button mounting 42' which are similar to flange 40 and mounting 42 in FIG. 5. However, in the modified ejector mechanism, the end portion of the flange 40 and the card engaging edge 41 have been changed so as to provide support for one or more friction members 50.

As shown in FIG. 7, the rear portion of the flange 40' includes two spaced elements 51 and 52 each of which are integrally formed with the remaining portion of flange element 40'. Each spaced portion includes an upper recess or seat 54 in which one run of a continuous elastic band 50' may be selectively seated and a lower recess 55 in which the lower run of the band is seated. A pair of depending edges 41' extend below the flange portions 51 and 52 a distance approximately equal to the thickness dimension of the article or card to be dispensed. Each edge 41' is also slightly angled toward the forward end of the ejector mechanism and thereby creates a ledge for positively securing the elastic bands in place within the recesses 54 and 55. The rear surface of each edge 41' is round or convex as shown at 53 for purposes which will be described in greater detail.

The modified ejector mechanism 35' provides for the positive and frictioned engagement of the mechanism with each card or other article being dispensed. In the embodiment shown, the lower run of each elastic band will engage the rear edge of the card to be dispensed. Due to the frictional surface characteristics of the elastic bands, the bands will have a tendency to positively engage the uppermost card in the dispenser and prevent the edge 41' from riding up and over a card being dispensed. The resilience and increased friction obtained by the bands permits the dispenser to be utilized with cards of varying thickness and the edges 41' insure that the bands are positively retained in a proper position for engaging the cards to be dispensed.

Further, once a card or other article has been dispensed, the arcuate rear surface 53 of the edges 41' will cause the ejector mechanism to ride up and slide across the uppermost card in a stack of cards in the dispenser as the ejector is returned to a rest or fully retracted position within the casing. As the curved surfaces extend slightly below the elastic bands, the bands will be elevated and spaced from the cards or other articles during the retraction of the ejector mechanism and thus, the bands will not bind with or engage the articles and interfere with the retraction of the ejector mechanism.

Although the embodiment shown in FIGS. 7 and 8 includes two rear portions 51 and 52 and two elastic bands 50', a single elongated portion and single band may be used. Further, it is contemplated that other frictional material may be utilized as desired, however, in order to reduce manufacturing costs and to provide a degree of resiliency or flexibility in the surface or surfaces which engage the edges of cards being dispensed, it is believed that the resilient bands will be the most convenient and effective. Also, such bands should preferably be of the same size as the band 33 used to retract the ejector mechanism.

Figure 11:
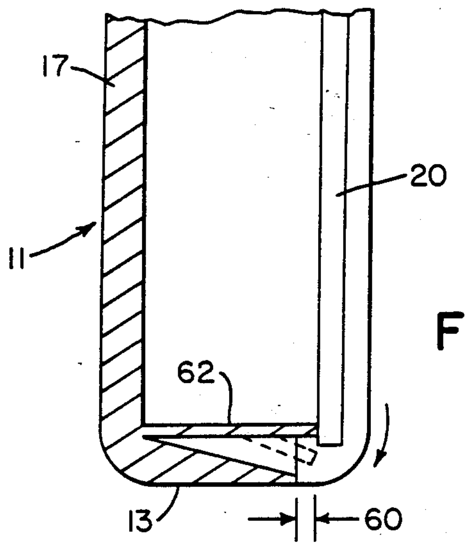
FIG. 11 is an enlarged partial cross sectional view taken along lines 11—11 of FIG. 9 showing the deflection of the restriction member in dotted line.
Figure 10:
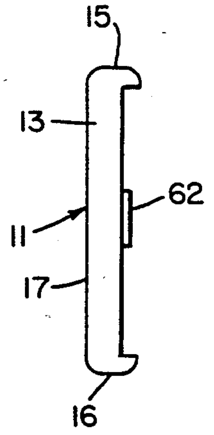
FIG. 10 is a front elevational view of the modified base of FIG. 9.
Figure 9:
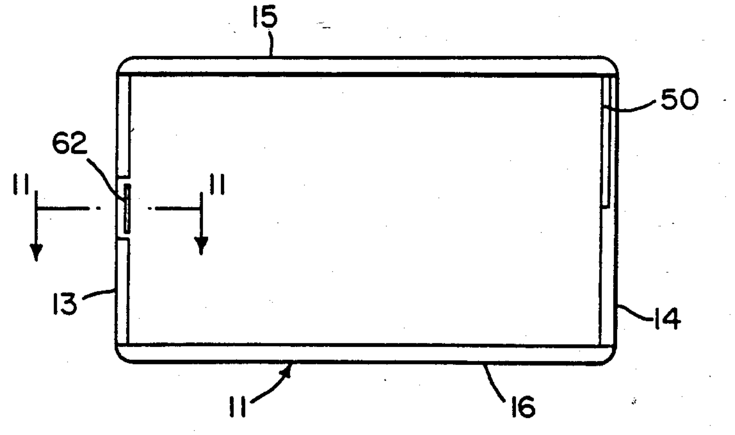
FIG. 9 is a top plan view of a modified base for the dispenser casing of the present invention including a yieldable card restriction member.

A further embodiment of the present invention is shown in FIGS. 9–11. In this embodiment, the base portion 11 of the housing or casing 12 has been modified slightly to prevent the accidental dispensing of more than a single card at one time. As previously discussed, business or calling cards are generally manufactured in conventional sizes and are made of materials having different thicknesses. Conventional cards normally range in thickness between 0.005 to 0.012 inch (0.127 to 0.305 mm). In order to accommodate conventional cards, the opening or slot 60 (see FIG. 6) through which the cards are dispensed must be of a size to permit the cards to pass therethrough. However, if the opening is of a such that where more than a single card may pass therethrough at a time, then with thinner cards, it is possible that more than one card will be dispensed with each operation of the ejector mechanisms. To prevent the accidental dispensing of more than a single card at a given time, the present embodiment includes a modified front wall structure shown at 13. In this embodiment, an upwardly extending restriction member 62 is integrally molded into the front wall 13. The restriction member is formed by molding the front wall to include a V-shaped recess generally centrally thereof as shown in FIG. 11. Although the restriction member 62 is shown as being located generally centrally of the front wall 13 of the base 11 of the casing of the dispenser, it is possible that two or more such members may be provided along the front wall or that the member may be formed along a more substantial portion of the front wall. In either case, it is important that the restriction member be yieldable so as to be easily deflected by the movement of a card adjacent thereto as the card is ejected through the opening or slot 60.

To accommodate conventional sizes of calling or business cards, the opening or dispensing slot 60 of the present invention is generally designed to be of a size of approximately 0.030 inch (0.762 mm). The restriction member, however, extends upwardly relative to the opening or dispensing slot a distance of approximately 0.025 inch (0.635 mm) so as to create an unobstructed opening of approximately 0.005 inch (0.127 mm). With this spacing, the thinnest cards to be dispensed from the housing may pass directly over the restriction member and through the opening 60. In this manner, any underlying card relative to a card being dispensed will be blocked by the restriction member and prevented from exiting through the opening. Even though the restriction member is designed to be yieldable, the restraint force exerted on the underlying card will be sufficient to overcome the frictional force between the upper card being dispensed and the underlying card so as to prohibit the underlying card from moving forwardly towards the opening. With thicker cards, the front edge of the uppermost card being dispensed will engage the upper edge of the restriction member moving it forwardly as indicated by the dotted line in FIG. 11. The restriction member is sufficiently yieldable so as to permit the card to deflect the upper portion of the member yet sufficiently rigid to prevent any underlying card from also passing above the member when it is deflected. Further, the restriction member is specifically designed so as not to damage the leading edge of any card being dispensed and therefore will not effect the professional appearance of cards which are ejected from the dispenser.

I claim:

1. A dispensing apparatus for dispensing generally planar articles stacked in a vertical array comprising a casing having ends, side, top and bottom walls, an article support plate mounted within said casing, an opening in said casing adjacent one end wall thereof through which articles may be slideably discharged, first resilient means mounted within said casing for resiliently urging said article support plate toward alignment with said opening, an ejector means slideably mounted within said casing, second resilient means connecting said ejector means to said article support plate, means for moving said ejector means between a first and second position, said ejector means having contact means for engaging an article carried by said article support plate as said ejector means is moved from said first to said second position, said second resilient means acting to normally retain said ejector mechanism in said first position and said second resilient means acting to apply a force on said article support plate away from said opening as said ejector means is moved from said first. toward said second position.

2. The dispensing apparatus of claim 1 in which said first resilient means includes a plurality of depending leg elements integrally formed therewith, each of said leg elements being resilient and extending downwardly with respect to said support plate so as to engage the bottom wall of said casing.

3. The dispensing apparatus of claim 1 in which said contact means of said ejector means includes at least one depending edge and at least one friction means disposed adjacent said depending edge for engaging an edge of the article as said ejector means is moved from said first to said second position.

4. The dispensing apparatus of claim 3 in which said depending edge includes forward and rear surfaces, said rear surface being arcuately shaped and extending outwardly relative to said friction means, said rear surface spacing said friction means from the article as said ejector means is moved from said second position to said first position.

5. The dispensing apparatus of claim 4 in which said friction means is a resilient element.

6. The dispensing apparatus of claim 1 in which said ejector means includes a body portion which is slideably engaged along a side wall of said casing and having upper and lower edges and front and rear portions, means disposed along the lower edge adjacent the front portion of said body portion for selectively supporting one end of said second resilient means and a second flange element disposed outwardly from said upper edge adjacent said rear portion of said body portion, said contact means being extended from second flange.

7. The dispensing apparatus of claim 6 in which said article support plate includes means for supporting the other end of said second resilient means, and said article support plate being disposed intermediate said first and second flange elements of said ejector means.

8. The dispensing apparatus of claim 7 in which said means for moving said ejector means includes a mounting member, said mounting member extending through an opening in a side wall of said casing and operating means secured outwardly of said casing engaging said mounting member so as to retain said ejector means in mounted relationship with respect to said opening in said side wall.

9. The dispensing apparatus of claim 8 in which said contact means includes at least one depending edge and at least one friction means disposed adjacent said depending edge for engaging an edge of the article as said ejector means is moved from said first to said second position.

10. The dispensing apparatus of claim 9 in which said depending edge includes forward and rear surfaces, said rear surface being arcuately shaped and extending outwardly relative to said friction means, said rear surface spacing said friction means from the article as said ejector means is moved from said second position to said first position.

11. The dispensing apparatus of claim 1 including restriction means adjacent said opening for restricting the number of articles which may be simultaneously discharged therethrough.

12. The dispensing apparatus of claim 11 in which said restriction means includes a yieldable member which extends upwardly from said bottom wall adjacent said front wall, said member having an upper edge which partially obstructs said opening, said member being yieldable toward said opening so as to permit an article to be slideably discharged through said opening.

13. The dispensing apparatus of claim 12 in which said front wall includes a recess adjacent said member, said member being selectively urged into said recess when being urged toward said opening.

14. A dispensing apparatus for dispensing generally planar articles such as business and calling cards which are attacked in a vertical array comprising a casing having ends, side and bottom walls, a lid slideably engagable with said side walls, an article support plate mounted within said casing, an opening in said casing adjacent one end wall thereof through which articles may be slideably discharged, first resilient means mounted within said casing for resiliently urging said article support plate toward alignment with said opening, an ejector means slideably mounted within said casing, means extending outwardly of said casing for operating said ejector means, second resilient means connecting said article support plate to said ejector means, said ejector means being movable between a first and second position and being normally urged to said first position by said second resilient means, said ejector means having contact means for engaging an article carried by said article support plate as said ejector means is moved from said first to said second position, said second resilient means acting to apply a force on said article support plate away from alignment with said opening as said ejector means is moved from said first to said second position.

15. The dispensing apparatus of claim 14 in which said portion of said ejector means for engaging an article carried by said support plate includes at least one depending edge and at least one friction means disposed adjacent said depending edge for engaging an edge of the article as said ejector means is moved from said first to said second position.

16. The dispensing apparatus of claim 15 in which said depending edge includes forward and rear surfaces, said rear surface being arcuately shaped and extending outwardly relative to said friction means, said rear surface spacing said friction means from the article as said ejector means is moved from said second position to said first position.

17. The dispensing apparatus of claim 16 in which said friction means includes a resilient band.

18. The dispensing apparatus of claim 15 including yieldable restriction means adjacent said opening for restricting the number of articles which may be simultaneously discharged therethrough, said yieldable restriction means extending upwardly to partially obstruct said opening.

19. The dispensing apparatus of claim 18 in which said restriction means includes a yieldable member which extends upwardly from said bottom wall adjacent said front wall, said member having an upper edge which partially obstructs said opening, said member being yieldable toward said opening so as to permit an article to be slideably discharged through said opening.

20. The dispensing apparatus of claim 14 including restriction means adjacent said opening for restricting the number of articles which may be simultaneously discharged therethrough in which said restriction means includes a yieldable member which extends upwardly from said bottom wall adjacent said front wall, said member having an upper edge which partially obstructs said opening, said member being yieldable toward said opening so as to permit an article to be slideably discharged through said opening.

21. The dispensing apparatus of claim 20 in which said ejector means includes a body portion which is slideably engaged along a side wall of said casing and having upper and lower edges and front and rear portions, means disposed along the lower edge adjacent the front portion of said body portion for selectively supporting one end of said second resilient means and a second flange element disposed outwardly from said upper side adjacent said rear portion of said body portion, said second flange having a card engaging means formed therein.

22. A dispensing apparatus for dispensing generally planar articles stacked in a vertical array comprising a casing having ends, side, top and bottom walls, an article support plate mounted within said casing, an opening in said casing adjacent one end wall thereof through which articles may be slideably discharged, first resilient means mounted within said housing for resilient urging said article support plate toward said opening, an ejector means slideably mounted within said casing between a first and second position, second resilient means connecting said ejector means to said article support plate and acting to urge said ejector means to said first position, said ejector means having contact means for engaging an article carried by said article support plate as said ejector means is moved from said first to said second position, and yieldable restriction means adjacent said opening for restricting the number of articles which may be simultaneously discharged through said opening.

23. A dispensing apparatus for dispensing generally planar articles stacked in a vertical array comprsing a casing having ends, side, top and bottom walls, an article support plate mounted within said casing, an opening in said casing adjacent one end wall thereof through which articles may be slideably discharged, first resilient means mounted within said housing for resiliently urging said article support plate toward said opening, an ejector means slideably mounted within said casing between a first and second position, said ejector means having contact means for engaging an article carried by said article support plate as said ejector means is moved from said first to said second position, said contact means including at least one depending edge, at least one friction means disposed adjacent said depending edge for engaging an edge of the article as said ejector means is moved from said first to said second position, said depending edge of said contact means including a rear surface which extends slightly beyond said resilient means whereby said resilient means will be spaced from an adjacent article as said ejection means is moved from said second position to said first position.

* * * * *